March 26, 1968   J. A. WEBB, SR   3,374,972
HINGED END SECTION FOR CARGO AIRCRAFT
Filed Sept. 27, 1965   3 Sheets-Sheet 1

INVENTOR.
JAMES A. WEBB, SR.
BY
Agent

March 26, 1968  J. A. WEBB, SR  3,374,972
HINGED END SECTION FOR CARGO AIRCRAFT
Filed Sept. 27, 1965  3 Sheets-Sheet 2

*INVENTOR.*
JAMES A. WEBB, SR.
BY
George A. Sullivan
Agent

March 26, 1968 J. A. WEBB, SR 3,374,972
HINGED END SECTION FOR CARGO AIRCRAFT
Filed Sept. 27, 1965 3 Sheets-Sheet 3

INVENTOR.
JAMES A. WEBB, SR.
BY
George C. Sullivan
Agent

United States Patent Office 3,374,972
Patented Mar. 26, 1968

3,374,972
HINGED END SECTION FOR CARGO AIRCRAFT
James A. Webb, Sr., Smyrna, Ga., assignor to Lockheed Aircraft Corporation, Burbank, Calif.
Filed Sept. 27, 1965, Ser. No. 490,358
14 Claims. (Cl. 244—137)

ABSTRACT OF THE DISCLOSURE

A door for the cargo compartment of an aircraft is provided which forms an aerodynamic clean end of the fuselage and swings vertically in visor fashion from the fuselage to an overhead, open position. Side pivots mount the visor door to the fuselage and a slidable center connection with drive gives the visor door three-point support to assure operating ease and stability. When opened, the door is located above the fuselage and its lower edge is configured to permit a field of vision under it from the cabin for taxiing and observing on and off cargo loading and to reduce the weight of the door.

---

This invention relates to cargo aircraft of the end loading and unloading type and more particularly to an end section for such aircraft that is readily movable to and from extreme positions where it forms in effect an integral aerodynamic extremity of the aircraft and where it is suspended above and in spaced relation to said extremity to expose the interior of the aircraft and thereby facilitate the ground operations thereof with minimum mechanical and structural complications.

Present day air transport operations are such that cargo aircraft are required to deliver substantial payloads expeditiously. This is measured not only by flight time requiring a clean and aerodynamic aircraft configuration for relatively high speed, but also by ground operations time requiring a maximum internal storage area that is fully accessible for rapid and efficient loading and subsequent unloading. End loading of the aircraft through both nose and tail has contributed substantially to expediting such ground operations.

In order to best fulfill the foregoing basic requirements, it is necessary therefore that the external surface of the end section of the aircraft form a smooth and uninterrupted continuation of the adjacent aircraft surface during flight operations and at the same time provide a relatively large and unobstructed access opening for cargo loading and unloading. Preferably, such access opening approximates the greatest transverse dimension of the cargo compartment within the aircraft to accommodate payloads of maximum size.

The present invention recognizes these basic requirements as well as others and the various ramifications thereof involved in end loading type of cargo aircraft and proposes to satisfy these many and diverse demands. To this end a new concept in hinged or swinging structures is herein contemplated that permits the complete removal of the end section of the aircraft from its closed position where it forms in effect an integral part of the fuselage for aerodynamic flight to an open position where it not only permits unrestricted access to the interior of the aircraft, but also unrestricted access to the entire ground area adjacent and around the aircraft.

The design, construction and arrangement of this end section including its mounting for movement is such that it imposes virtually no burden on the aircraft insofar as the normal operating functions thereof are concerned. With the end section open or closed, the aircraft is free to taxi to the same degree as any other aircraft. With the end section closed, it, with the remainder of the fuselage, defines a storage area for all intents and purposes equal to such an aircraft with an unmovable end section. Moreover, the mounting and supporting structure of, and the actuating mechanism for, this end section are housed totally within the aircraft and, while uncomplicated, requiring a minimum of storage space therein, constitutes a firm and positive connection of the end section when open to the aircraft in a balanced and secure position where it is substantially immovable and not easily damaged.

While the hinged end section herein proposed is equally applicable to the nose or tail of cargo aircraft, it has particular utility and offers special advantages when applied to the fuselage nose. In this case it extends forwardly of the pilot's compartment or control station and is adapted to swing to and from the open position without in any way affecting the normal functions and activities within the control station. Thus, the several power lines, linkage, etc., incidental to the operation of the control station remain intact at all times and the pilot's or operator's vision therefrom is not obstructed when the nose section is open. This permits a clear view both during the loading and unloading operation and during ground taxiing of the aircraft.

More specifically, this nose section is generally U-shaped in plan with the arms thereof terminating one on each side of the fuselage to which it is pivotally connected. The nose section thus straddles the control station and, when opened, swings over and around the front thereof to an ultimate position in spaced relation thereto. This space allows an unobstructed forward view from the control station.

Additionally, the nose section is connected to the fuselage at substantially the transverse center thereof through actuating means by which it is forcibly moved to and from the open position. This connection together with the pivotal side connections forms a three-point support for the nose section assuring its arcuate movement in a plane longitudinally of the fuselage as well as its balanced and stable position at every location along that path of movement. The possibility of misalignment of the fuselage and nose section when closed and sealed is thereby eliminated.

Moreover, the coacting edges of the fuselage and nose section at and along each side slant or slope in a forward direction from top to bottom. This serves to substantially reduce the total weight of the nose section required to be lifted as well as the total travel of the nose section in order to provide a full fuselage opening with the raised nose section disposed as an overhead cover protecting the area immediately adjacent the opening in foul weather. At the same time, the bottom portion of the fuselage is extended forward increasing the deck area thereof and providing a strong support for the ramp structure which operates therefrom.

The above and other objects of this invention will become more apparent with the disclosure that follows and in which the construction, combination and arrangement of parts are more fully described, claimed and illustrated in the accompanying drawings wherein:

Referring more specifically to the drawings, F designates the forward portion of an aircraft having a cargo compartment C therein and a control station S above and adjacent the forward end of such compartment. An upper deck U separates the control station S from the compartment C and the various connectors and links between the several controls for the entire operation of the aircraft by the pilot and crew, and their respective operating units and mechanisms are made to pass through this deck U.

At and along the bottom of the aircraft or fuselage F is a lower deck L constituting the floor of the compartment C. The deck L is of conventional construction, generally hollow and reinforced with ribs, bulkheads and the like to give it structural integrity to support the load or cargo to be placed thereon. At its forward end the deck L is colsed by a wall 10 to which an extendable and retractable ramp R is hinged following standard practices. An aft portion of the deck L is in turn hinged to the fuselage F at 11 and at its free end connected to the fuselage F through power actuator means 12 to raise and lower it whereby it is made to form an extension of the ramp R in the extended or lowered position. When raised, this aft portion of the deck L conforms to the fuselage F constituting an aerodynamically clean continuation of its external configuration and an extension of the compartment floor internally.

In order to facilitate on and off cargo loading of the compartment C, a movable nose section 14 is provided at the forward end of the aircraft F. For this purpose the compartment C per se terminates in an opening 15 that exposes the entire interior thereof and the nose section 14 is adapted to overlie and enclose this opening being disposed with the base of the generally conical wall that defines it in end-to-end abutment with the walls defining the opening 15. Thus disposed the nose section 14 forms a smooth and unbroken continuation of the aircraft F. The opening 15 is preferably located at substantially the greatest transverse dimension of the compartment C.

Figure 1:
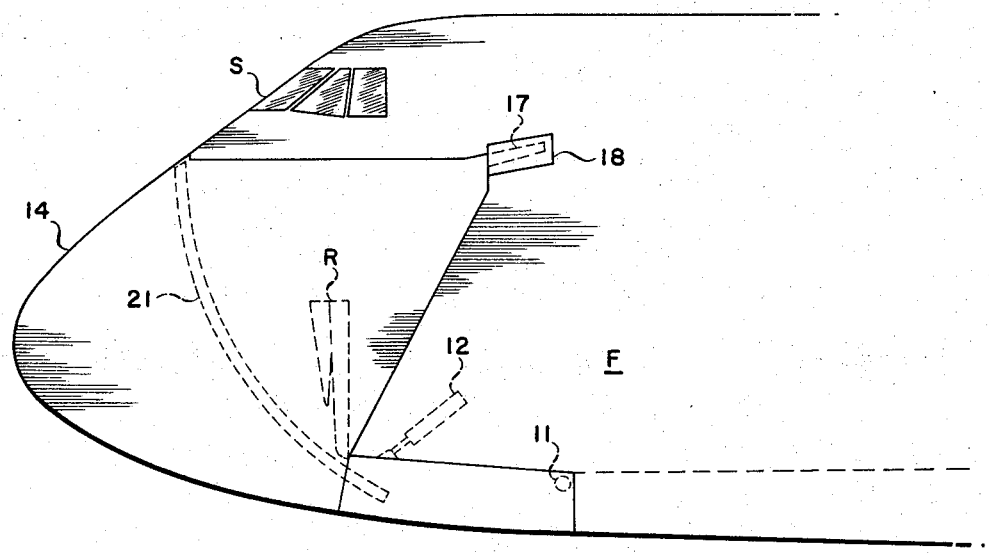
FIGURE 1 is a side elevation of the forward portion of a cargo aircraft to show a hinged nose section constructed in accordance with the teachings of the invention as applied thereto to form an integral part thereof and forming an aerodynamically clean and smooth continuation of the fuselage during flight.
Figure 7:
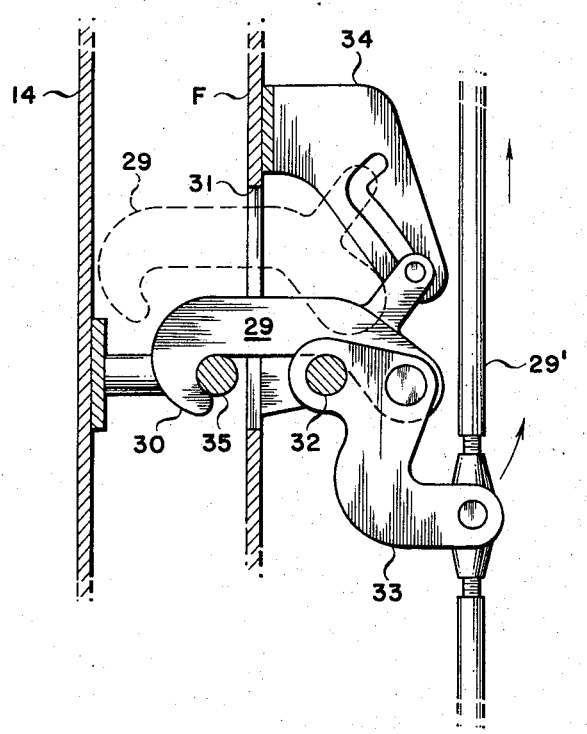
FIGURE 7 is a detail showing one of the several latches employed between the nose section and the fuselage to releasably secure them against all relative movement when the nose is in the closed position, only the associated portion of the nose section and fuselage being shown generally and the released position of the latch in broken line.
Figure 2:
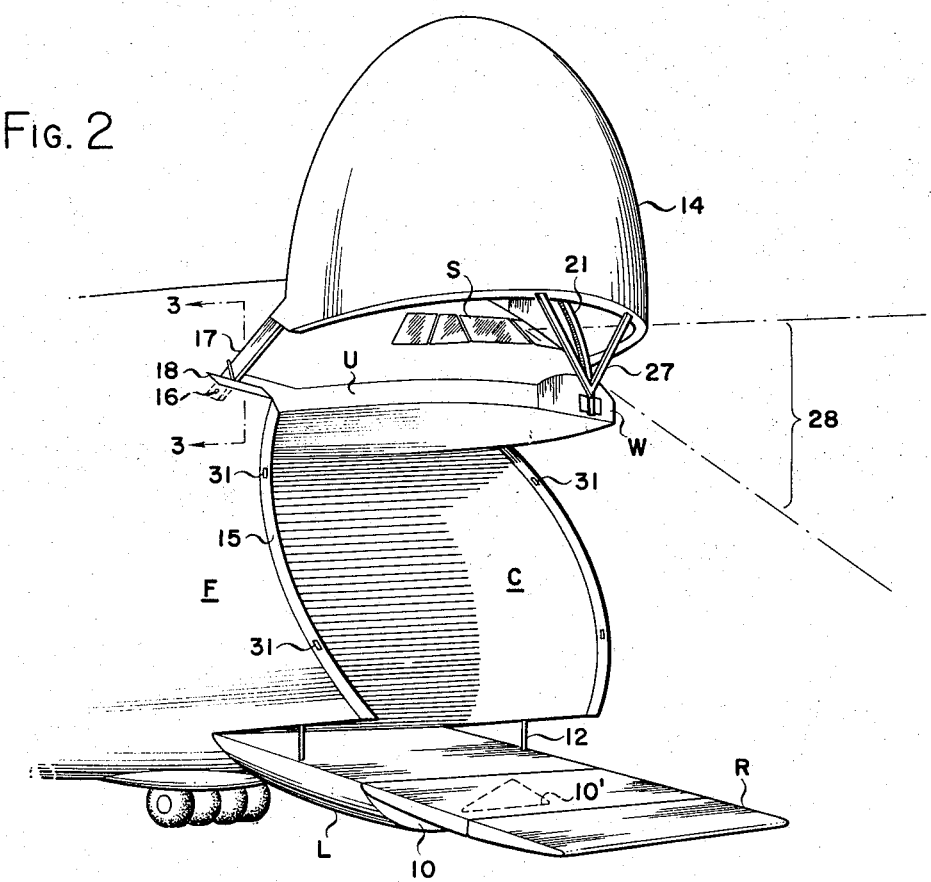
FIGURE 2 is an isometric view thereof showing the nose section in the raised position to expose the interior of the aircraft to facilitate the loading and unloading of cargo.
Figures 3, 4:
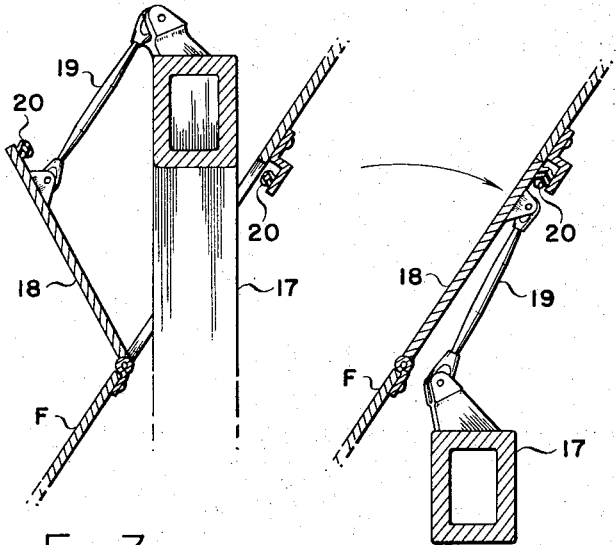
FIGURE 3 is a section taken along line 3—3 of FIGURE 2 to show one of the arms of the nose section extending through an opening provided therefor in the fuselage when the nose section is in the open position and the associated fairing means to close such opening when the nose section is closed.
FIGURE 4 is a similar section showing the arm retracted and the fairing within and filling the fuselage opening.
Figure 6:
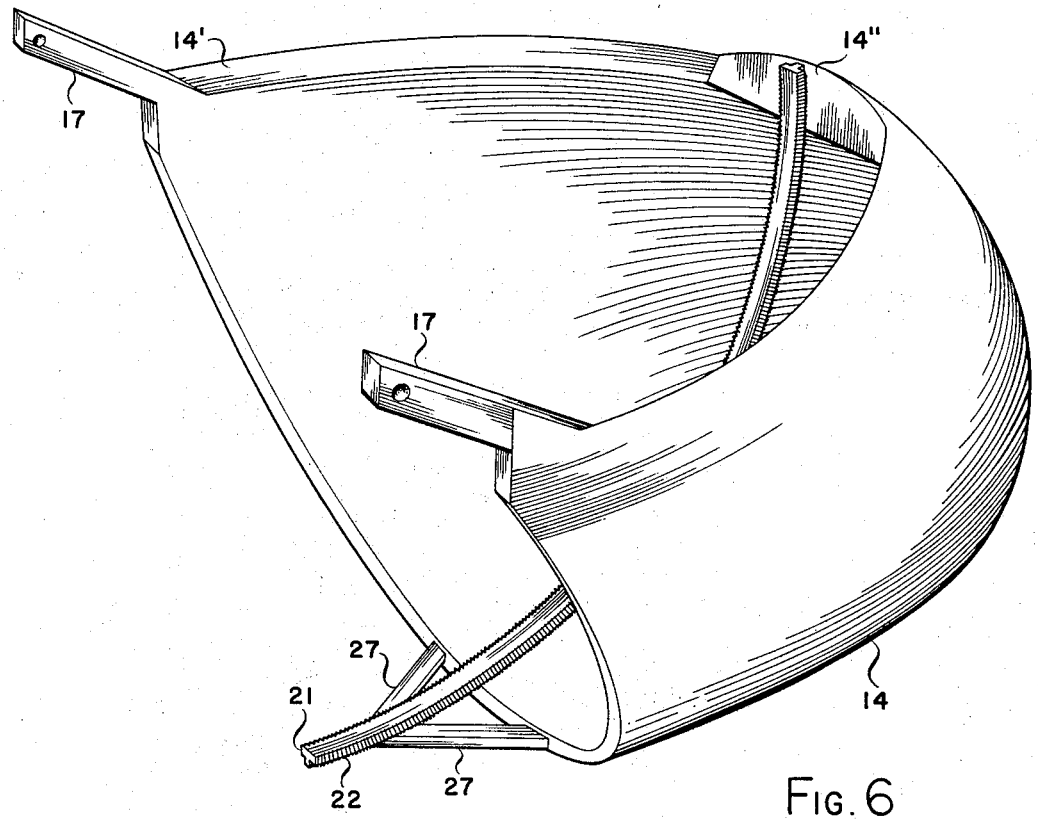
FIGURE 6 is an isometric view of the nose section alone.
Figure 5:
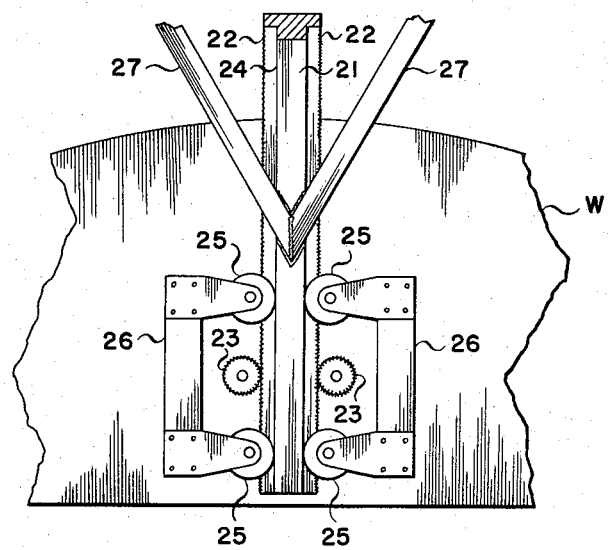
FIGURE 5 is a fragmentary view of the forward end of the fuselage at the transverse center thereof to show the connection of the nose section thereto as well as the actuating means by which the nose section is forcibly moved to and from its open and closed position.

As viewed in FIGURE 1, the abutting edges of the fuselage F and nose section 14 slant forwardly from top to bottom and the wall of the nose section 14 is contoured as at 14' (FIGURE 6) to conform to the perimeter of deck U. At its forward extremity the deck U terminates in a blunt wall W that is perpendicular to the longitudinal center line of the fuselage F. The corresponding edge or wall of the nose section 14 is closed by a similar bulkhead 14'' recessed slightly to be disposed a distance internally of the nose section 14 for reasons to become more apparent. Thus, the upper edge of the nose section (FIGURE 1) extends aft of the control station S and the upper deck U forming an integral and stationary part of the aircraft F is substantially surrounded by the nose section 14 which is generally U-shaped in plan.

Symmetrically disposed on each side of the aircraft F adjacent the opening 15 is a fixed hinge element or pivot 16 secured to structure of the deck U. A complemental hinge element or arm 17 secured to and projecting from fixed structure of the nose section 14 is rotatably mounted on the pivot 16 whereby the nose section 14 is capable of being swung vertically. To permit this the transverse dimension of the deck U and the wall of the nose section 14 that abuts it when the nose section 14 closes opening 15 is appreciably less than that of the adjacent portion of the nose section 14.

Additionally, if desired or where the contour of the aircraft requires it, a door 18 may be provided on the exterior of the deck U adjacent each hinge connection 16, 17 adapted to open and close an enlarged opening in the deck U through which the rotatable arm 17 passes. Each door 18 is hinged to deck structure along the bottom side of its opening and pivotally connected on its inner surface to a link 19 pivotally connected at its other end to the arm 17 of the nose section 14. Thus, as the nose section 14 is raised and lowered by rotation on its hinge connections 16, 17, the doors 18 are concurrently opened and closed, respectively. When closed, these doors lie in the plane of the surrounding skin of the aircraft F and thereby constitute fairings. If desired, coacting seals such as flexible tubes 20 may be employed around the perimeter of each door 18 and its associated opening.

At its transverse center the nose section 14 is also connected to stationary aircraft structure by means of and through a mechanism which serves the added function of forcibly driving it to and from its open and closed positions. More specifically, internally the nose section 14 carries a fixed structural rib 21 that is curved describing an arc of a circle drawn about the hinge connections 16, 17. This rib 21 is secured in any conventional manner to the inner surface of the nose section 14 and to the outer surface of bulkhead 14'' and carries a gear track 22 on each side for constant meshing coaction with a drive gear 23 projecting from the wall W of the deck U. The gears 23 are symmetrically disposed about the transverse center of the deck U and are driven in unison in opposite directions by conventional means located within the deck U. Parallelly disposed on the rib 21 adjacent each track 22 is a guide 24 to engage a pair of rollers 25 that straddle each gear 23. Each pair of rollers 25 are carried by a support 26 secured to and projecting from the deck U whereby to ensure the constant engagement of the gears 23 in their respective tracks 22 as well as to prevent relative lateral movement of the nose section 14 and the aircraft F during its vertical swinging movement.

If desired, side braces 27 may be provided to further stabilize the position of the nose section 14 on the aircraft F, particularly when disposed in the fully open position. These braces 27 when employed are disposed one on either side of the rib 21 each being secured at one end to the outer or forward face of the rib 21 adjacent the lower extremity thereof and at the other end to structure of the nose section 14.

The lower extremity of the rib 21 is made to extend beyond the limits of the associated wall of the nose section 14 a predetermined distance to dispose the nose section 14 when fully opened or raised in spaced relation to the adjacent surface of the aircraft F. A field of vision 28 is thereby established from the control station S beyond the raised nose section 14 permitting the pilot or operator of the aircraft to observe all ground operations, notably loading and unloading of the compartment C and taxiing. A cutout 10' is provided in the end wall 10 of the lower deck L to accommodate the extended portion of the rib 21 as well as the braces 27 when the nose section 14 is in the closed position.

At and along the edge of the opening 15 and deck U, the fuselage F carries a plurality of latches 29 all interconnected by push-pull linkage 29' for the actuation thereof in unison. Each such latch 29 is disposed within the fuselage F being mounted within the wall thereof with its hook 30 operating through an opening 31 provided therefor. This hook 30 is pivotally mounted as at 32 on the fuselage F through a bellcrank lever 33 the opposite end of which is connected to the push-pull linkage 29'. The path of movement of the hook 30 by actuation of the linkage 29' is controlled by a guide member 34 by which it is slidably engaged.

Complemental to each latch 29 is a catch 35 fixed to and projecting from structure of the nose section 14. When the nose section 14 is closed covering the opening 15 in the fuselage F, each catch 35 is disposed adjacent the hook 30 of its respective latch 29 whereby actuation of the linkage 29' effects movement of the several hooks 30 in unison to positively engage their catches 35. Conversely, when the nose section 14 is to be opened in the manner previously described, actuation of the linkage 29' causes the disengagement of the several catches 35 by their hooks 30.

The foregoing description is directed to a preferred embodiment of the invention as illustrated for the purpose of clearly disclosing the inventive concept. Various changes and modifications will be obvious to those skilled in the art without departing from the invention as covered by the appended claims, which alone define the scope of this invention.

What is claimed is:
1. A hinged end section for cargo aircraft comprising:
a generally conical body having a base conforming with the associated end of the aircraft and adapted to abut therewith to form an aerodynamically clean continuation thereof;
a pair of fixed arms of equal length extending from said body at the base thereof,
said arms being disposed on opposite sides of the aircraft and symmetrically about the longitudinal center line thereof;
a pivotal connection between each said arm and aircraft structure; and
a slidable connection at the transverse center and top of said aircraft and the transverse center of said body constituting an extension link translating the body vertically to a position above and with its base edge spaced from said aircraft exposing the interior thereof when the body is rotated on its pivotal connections aforesaid.

2. The invention of claim 1 including a cutout in the top of said body from the base thereof to a point medially of the distance to its apex and having an edge that conforms to a projecting portion of said aircraft to thereby abut the edge thereof and form an aerodynamically clean continuation thereof when the base of said body abuts the end of the aircraft as aforesaid.

3. The invention of claim 2 wherein said pivotal connections align and are disposed adjacent the root of said projecting portion.

4. The invention of claim 1 wherein the line of abutment of said base and said aircraft forms an acute angle with the vertical adjacent the top of the aircraft.

5. The invention of claim 4 wherein said pivotal connections align and are disposed adjacent said acute angle.

6. The invention of claim 1 including an external surface carried by each of said arms having a contour that conforms to and is disposed in the plane of the adjacent surface of said aircraft.

7. The invention of claim 1 wherein said slidable connection comprises a fixed track carried by said conical body and a power drive mounted on said aircraft and engageable with said track.

8. The invention of claim 7 wherein said track is formed with teeth at and along each side thereof and said drive comprises a gear in mesh relation with each row of said teeth and concurrently rotatable in opposite directions.

9. The invention of claim 8 including guide means carried by said aircraft and disposed on each side of each of said gears in constant contact with said track in relative opposition to each other.

10. The invention of claim 1 including a plurality of connectors operative between said base and said associated end of the aircraft when abutting as aforesaid to secure them against all relative movement, and an actuator for the release of said connectors.

11. The invention of claim 10 wherein said connectors include latches carried by said aircraft and projecting therefrom to engage complemental catches carried by said body, and said actuator includes linkage interconnecting all of said latches for movement in unison.

12. The combination with an aircraft having a cargo compartment therein, an opening at the forward end of said compartment exposing the interior thereof and a control station overlying said opening and located above the centerline of the aircraft; of a hollow, generally conical body adapted to overlie and enclose said opening forming an aerodynamically clean continuation of said aircraft around said control station and terminating in a nose on the aircraft; a pivotal connection between said body and said aircraft transversely thereof; and power means operable to swing said body about said connection to a position above and over said control station.

13. The combination with an aircraft having a fuselage with a cargo compartment therein and a control station at one end of said fuselage above said compartment; of an opening in said fuselage at substantially the greatest transverse dimension of said compartment; a generally conical body adapted to overlie and enclose said opening and extend from said fuselage and control station forming an aerodynamically clean end on said fuselage; a pivotal connection between said body and said fuselage on each corresponding side thereof; and a drive operable to rotate said body on the connections aforesaid vertically to a position overlying said control station.

14. The combination of claim 13 wherein each said pivotal connection includes a rigid arm carried by and extending from said body and rotatably connected at its outer end to said fuselage.

References Cited
UNITED STATES PATENTS

| | | | |
|---|---|---|---|
| 3,051,419 | 8/1962 | Weiland et al. | 244—137 |
| 2,268,009 | 12/1941 | Babb et al. | 244—118 |
| 2,283,746 | 5/1942 | Lohs | 74—422 |
| 2,323,279 | 6/1943 | Van Zelm | 244—137 |
| 2,738,972 | 3/1956 | Morris | 244—121 X |
| 2,998,212 | 8/1961 | Rogers | 244—121 |
| 3,149,802 | 9/1964 | Wigal | 244—17.11 |

FERGUS S. MIDDLETON, *Primary Examiner.*